United States Patent
Chang et al.

(10) Patent No.: US 9,799,337 B2
(45) Date of Patent: Oct. 24, 2017

(54) MICROPHONE APPARATUS FOR ENHANCING POWER CONSERVATION

(71) Applicant: MERRY ELECTRONICS(SUZHOU) CO., LTD., Jiangsu (CN)

(72) Inventors: Chao-Sen Chang, Hsinchu (TW); Shen-Hang Wei, Hsinchu (TW); You-Hsien Lin, Hsinchu (TW); Yung-Shiang Chang, Hsinchu (TW)

(73) Assignee: MERRY ELECTRONICS(SUZHOU) CO., LTD., Jiangsu Province (CN)

( * ) Notice: Subject to any disclaimer, the term of this patent is extended or adjusted under 35 U.S.C. 154(b) by 0 days.

(21) Appl. No.: 15/132,252

(22) Filed: Apr. 19, 2016

(65) Prior Publication Data

US 2017/0256263 A1    Sep. 7, 2017

(30) Foreign Application Priority Data

Mar. 2, 2016  (TW) .............................. 105106307 A

(51) Int. Cl.
   *G10L 15/28*   (2013.01)
   *H04R 1/04*   (2006.01)
   *H04R 29/00*   (2006.01)

(52) U.S. Cl.
   CPC ................ *G10L 15/28* (2013.01); *H04R 1/04* (2013.01); *H04R 29/004* (2013.01)

(58) Field of Classification Search
   CPC ............................... B81B 7/007; G10L 15/00
   See application file for complete search history.

(56) References Cited

U.S. PATENT DOCUMENTS

| | | | | |
|---|---|---|---|---|
| 2005/0182631 | A1* | 8/2005 | Lee | G10L 15/22 704/275 |
| 2014/0274203 | A1* | 9/2014 | Ganong, III | H04W 52/0251 455/556.1 |
| 2015/0032238 | A1* | 1/2015 | Ondo | H04M 1/6041 700/94 |
| 2015/0063577 | A1* | 3/2015 | Song | G10H 1/0091 381/61 |
| 2016/0253187 | A1* | 9/2016 | Kim | G06F 9/44505 719/320 |

* cited by examiner

*Primary Examiner* — Mohammad Islam
(74) *Attorney, Agent, or Firm* — JCIPRNET

(57) ABSTRACT

A microphone apparatus is provided. Whether an electronic signal converted from an audio signal is in compliance with a preset sound characteristic and a preset voice recognition information is determined. When the electronic signal is in compliance with the preset sound characteristic and the preset voice recognition information, an actuation control signal is outputted, so as to trigger an operation of an external circuit external to the microphone apparatus.

10 Claims, 3 Drawing Sheets

MICROPHONE APPARATUS FOR ENHANCING POWER CONSERVATION

CROSS-REFERENCE TO RELATED APPLICATIONS

This application claims the priority benefit of Taiwan Patent Application No. 105106307, filed on Mar. 2, 2016. The entirety of the above-mentioned patent application is hereby incorporated by reference herein and made a part of this specification.

BACKGROUND OF THE INVENTION

Field of the Invention

The invention is related to a sound receiving apparatus, and particularly to a microphone apparatus.

Description of Related Art

Along with the evolution of technology, handheld electronic device having voice system is more common nowadays. The voice system allows user to communicate with a mobile terminal through voice recognition technique. For example, the user may speak a certain request to the handheld electronic device, such as inquiring transportation schedule, whether, or phone number to be dialed, etc., the system may perform a corresponding action according to the voice signal of the user.

Although the handheld electronic devices have become convenient in daily life, problems such as power consumption have become an issue as the handheld electronic devices become more powerful. As for the trends leads toward a smaller handheld electronic device in physical size, spaces for the battery is limited which also limits the power capacity the handheld electronic device. Therefore, how to decrease the power consumption of the handheld electronic device has become one of very important issue in the field.

SUMMARY OF THE INVENTION

The disclosure provides a microphone apparatus that effectively enhances power conservation.

A microphone apparatus of the disclosure is adapted to an electronic device. The microphone apparatus includes a Micro-Electro-Mechanical System (MEMS) circuit, an integrated circuit (IC), and a voice recognition circuit. The MEMS circuit converts an audio signal received by the microphone apparatus into an electrical signal. The IC is coupled to the MEMS circuit and amplifies the electrical signal. The voice recognition circuit is coupled to the IC and triggers an operation of an external circuit external to the microphone apparatus through the processing unit. The processing unit determines whether the electrical signal is in compliance with a predetermined sound characteristic and whether the electrical signal is in compliance with the sound recognition information while the electronic device is in a sleep mode, wherein the processing unit sends an actuation control signal when the electrical signal is in compliance with the predetermined sound characteristic and the sound recognition information, so that the voice recognition circuit triggers the operation of the external circuit external to the microphone apparatus.

In one of the exemplary embodiments of the disclosure, the voice recognition circuit includes a detection unit, a storage unit, and a triggering unit. The detection unit is coupled to the IC, detects a sound characteristic of the electrical signal and configured to determine whether the electrical signal is in compliance with the predetermined sound characteristic and activate the processing unit if the electrical signal is in compliance with the predetermined sound characteristic. The storage unit is coupled to the processing unit and configured to store a sound recognition information. The triggering unit is coupled to the processing unit and configured to trigger an operation of the external circuit external to the microphone apparatus after the actuation control signal is received.

In one of the exemplary embodiments of the disclosure, the detection unit is a voice activity detector (VAD).

In one of the exemplary embodiments of the disclosure, the voice recognition unit includes a transmission interface unit. The transmission interface unit is coupled to the processing unit. The processing unit receives an update recognition information through the transmission interface unit and stores the update recognition information to the storage unit as the sound recognition information.

In one of the exemplary embodiments of the disclosure, the transmission interface unit is an inter-integrated circuit (I2C) transmission interface.

In one of the exemplary embodiments of the disclosure, the electrical signal is an analog signal, and the IC converts the electrical signal to a digital signal.

In one of the exemplary embodiments of the disclosure, the predetermined sound characteristic is a predetermined threshold. The processing unit determines whether the sound characteristic of the electrical signal is in compliance with the predetermined sound characteristic if a sound volume of the audio signal received by the microphone apparatus is greater than the predetermined threshold.

In one of the exemplary embodiments of the disclosure, the sound recognition information is a keyword. The processing unit compares the electrical signal to the keyword, and the processing unit determines that the electrical signal is in compliance with the sound recognition information if the electrical signal is in compliance with the keyword.

In one of the exemplary embodiments of the disclosure, the processing unit first determines whether the electrical signal is in compliance with the predetermined sound characteristic, and then determines whether the electrical signal is in compliance with the sound recognition information.

In one of the exemplary embodiments of the disclosure, the microphone apparatus as claimed in claim 1 further including an internal clock generator. The internal clock generator is coupled to the IC and the voice recognition circuit. The internal clock generator provides an internal clock signal to the IC and the voice recognition circuit as an operation clock signal for the IC and the voice recognition circuit under the sleep mode.

In one of the exemplary embodiments of the disclosure, the internal clock generator provides clock signals having different frequencies.

Based on the above, when the processing unit of the exemplary embodiments within an electronic device is in a sleep mode, whether the electrical signal converted from the sound signal is in compliance with the predetermined sound characteristic and the sound recognition information. Only when the electrical signal converted from the sound signal is in compliance with the predetermined sound characteristic, an activating signal is sent for the voice recognition circuit to trigger the operation of the external circuit external to the microphone apparatus. Accordingly, a reparative wakeup of the external circuit which generates unnecessary power consumption may be prevented.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
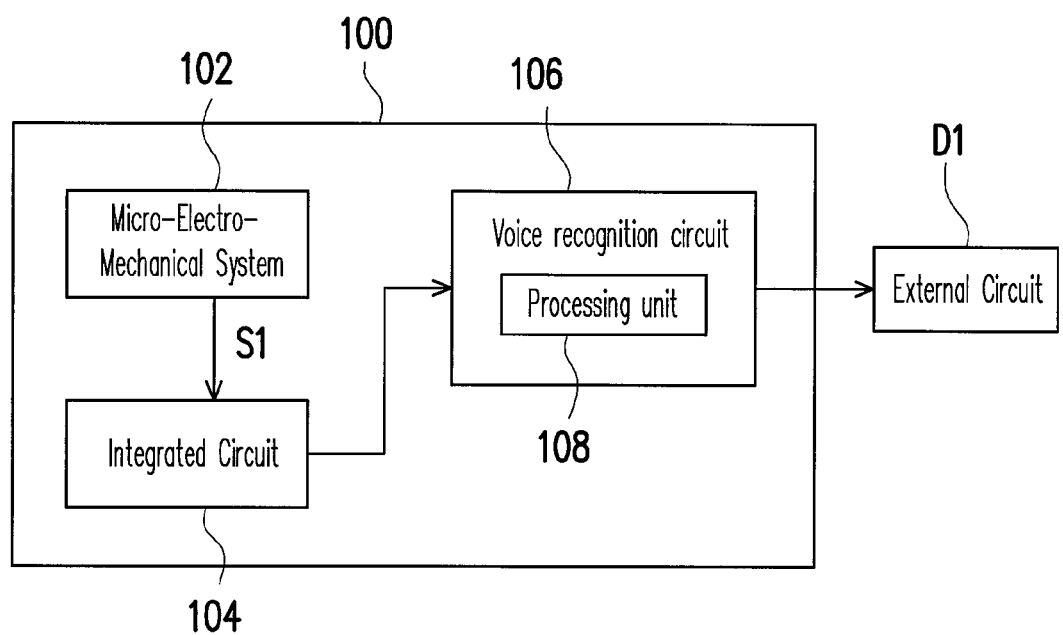
FIG. 1 is a diagram illustrating a microphone apparatus according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram illustrating a microphone apparatus according to an exemplary embodiment of the disclosure. With reference to FIG. 1, a microphone apparatus 100 may be configured to an electronic device, and the electronic device may be cellular phone, tablet, computer, or other handheld electronic devices. The microphone apparatus 100 includes a Micro-Electro-Mechanical System (MEMS) circuit 102, an integrated circuit (IC) 104, and voice recognition circuit 106. The IC 104 is coupled to the MEMS circuit 102 and the voice recognition circuit 106. The voice recognition 106 is further coupled to an external circuit D1 external to the microphone apparatus 100. The external circuit D1 is configured in the electronic device and configured to execute high level voice signal process. As compared to the voice recognition 106, the external circuit D1 has consumes more power. In the exemplary embodiment, the external circuit D1 may be voice encoding circuit, however, the disclosure is not limited thereto.

The MEMS circuit 102 is utilized to convert an audio signal received by the microphone apparatus 100 into an electrical signal S1. The IC circuit 104 is then configured to receive the electrical signal S1 and perform one of processes including an analog-to-digital conversion and an amplification of the electrical signal. If the electrical signal S1 is already a digital signal, the IC circuit 104 would then amplifies the electrical signal S1. If the electrical signal S1 is an analog signal, the IC circuit 104 would perform the process of analog-to-digital conversion and then amplifies the resulting signal. In some of the embodiments only the process of analog-to-digital conversion is performed to the electrical signal S1. The voice recognition circuit 106 may include a processing unit 108. The voice recognition circuit 106 may enable the external circuit D1 external to the microphone apparatus 100 to operate, for example, the external circuit D1 may be enabled to perform voice encoding process, however, the disclosure is not limited thereto.

In detail, the processing unit 108 may determine whether the electrical signal S1 is in compliance with a predetermined sound characteristic, and whether the electrical signal S1 is in compliance with sound recognition information, while the electronic device is in a sleep mode. The sound characteristic may be a predetermined threshold of a sound volume. If the processing unit 108 determines that a volume of the voice signal received by the microphone apparatus 100 is greater than the predetermined threshold based on the electrical signal S1, the processing unit 108 may determine that the sound characteristic of the electrical signal S1 is in compliance with the predetermined sound characteristic. It should be noted that, in other exemplary embodiments, the predetermined sound characteristic may be, for example, other sound characteristics such as sound frequency, and the predetermined threshold may be a predetermined sound frequency. Furthermore, the sound recognition information may be, for example, keywords such as password, user name, etc. The processing unit 108 may compare the content corresponding to the electrical signal S1 to the keywords, and if the content of the electrical signal S1 is in compliance with the keywords, the processing unit 108 determines that the electrical signal S1 is in compliance with the sound recognition information.

When the electrical signal S1 is in compliance with the predetermined sound characteristic as well as the sound recognition information, the processing unit 108 may send an actuation control signal, so as enable the voice recognition circuit 106 to operate the external circuit D1 external to the microphone apparatus 100 (e.g., voice encoding operation of the voice signal.) In detail, the processing unit 108 may first determine whether the electrical signal S1 is in compliance with the predetermined sound characteristic, and then determines whether the electrical signal S1 is in compliance with the voice recognition information, so as to rapidly determines whether the operation of the external circuit D1 is needed. However, the disclosure is not limited thereto. In some of the exemplary embodiments, the processing unit 108 may first determine whether the electrical signal S1 is in compliance with the sound recognition information and then determines whether the electrical signal S1 is in compliance with the predetermined sound characteristic.

Since the sound received by the microphone apparatus 100 may be obtained from any source in the environment, rather than a voice signal of a user for waking up the electronic device, the exemplary processing unit 108 would first determine whether the electrical signal S1 is in compliance with the predetermined sound characteristic and the sound recognition information after the electronic device has entered the sleep mode. As a result, unnecessary operation of the external circuit D1 may be filtered, which avoid unnecessary power consumption caused by the external circuit D1. In the exemplary embodiment, the processing unit 108 may be implemented by a digital signal processor (DSP), which is only responsible for executing a simple function of determining whether the electrical signal S1 is in compliance with the predetermined sound characteristic and the sound recognition information. The power consumption of the electronic device may be reduced, since the power consumption of the processing unit 108 is much lower the power consumed during the operation of a voice encoding circuit. Furthermore, as compared to the conventional technique, the exemplary embodiment processes the voice signal by configuring an independent DSP. As a result, the production cost of the microphone apparatus 100 of the exemplary embodiment may be reduced, and the volume which occupies is reduced as well.

Figure 2:
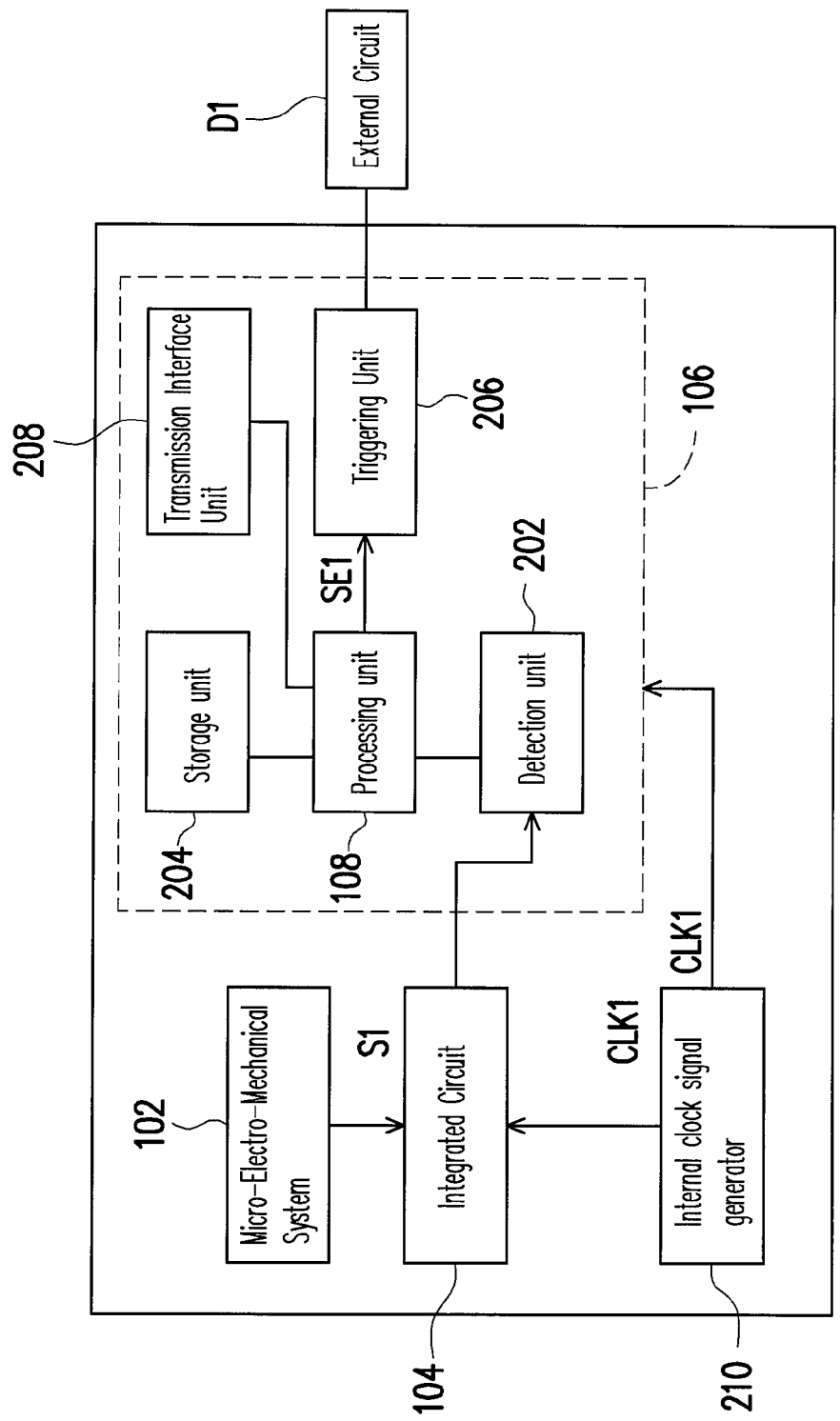
FIG. 2 is a diagram illustrating a microphone apparatus according to another exemplary embodiment of the disclosure.

FIG. 2 is a diagram illustrating a microphone apparatus according to another exemplary embodiment of the disclosure. In detail, the exemplary voice recognition circuit 106 may further include a detection unit 202, a storage unit 204, a triggering unit 206, and a transmission interface unit 208. The processing unit 108 is coupled to the detection unit 202, the storage unit 204, the triggering unit 206 and the transmission interface unit 208. The detection unit 206 is further coupled to IC circuit. The triggering unit 206 is further coupled to the external circuit D1. The detection unit 202 is configured to detect the sound characteristic of the electrical signal S1 and determines whether the electrical signal S1 is in compliance with the predetermined sound characteristic. If the electrical signal S1 is in compliance with the predetermined sound characteristic, the processing unit 108 is activated. For example, assuming that the sound characteristic is the sound volume in the exemplary embodiment, when the volume of the electrical signal S1 exceeds the predetermined threshold, the processing unit 108 is activated, where the detection unit 202 may be implemented by a Voice Activity Detector (VAD) which is configured to detect the sound volume of the electrical signal S1. In the exemplary embodiment, the processing unit 108 may immediately determine that the electrical signal S1 is in compliance with the sound characteristic after the processing unit 108 is activated, since the processing unit 108 is only activated by the detection unit 202 when the detection unit 202 determines that the electrical signal S1 is in compliance with the sound characteristic. Next, the processing unit 108 determines whether the electrical signal S1 is in compliance with the sound recognition information. If it is determined that the electrical signal S1 is not in compliance with the sound recognition information, the detection unit 202 prohibits the activation of the processing unit 108. If the electrical signal is in compliance with the sound recognition information, then the actuation control signal SE1 is sent, so as to enable the external circuit external to the microphone apparatus 100 to operate. Since the processing unit 108 is only activated when the electrical signal is in compliance with the sound characteristic, the power consumption is further reduced.

The storage unit 204 is utilized to store sound recognition information for the processing unit 108 to use when determining whether the electrical signal S1 is in compliance with the sound recognition information. The sound recognition information stored in the storage unit 204 may be updated through receiving updated recognition information from the transmission interface unit 208. The processing unit 108 may store the updated recognition information to the storage unit 204 as the sound recognition information. In the exemplary embodiment the transmission interface unit may be, for example, an Inter-Integrated Circuit (I2C) transmission interface, however, the disclosure is not limited thereto. Furthermore, the triggering unit 206 is utilized to receive the actuation control signal SE1 from the processing unit 108 when the processing unit 108 determines that the electrical signal S1 is in compliance with the predetermined sound characteristic and the sound recognition information. Accordingly, the external circuit D1 external to the microphone 100 is triggered to perform operations.

Furthermore, in the exemplary embodiment, the microphone apparatus 100 further includes an internal clock generator 210, which is coupled to the IC circuit 104 and the voice recognition circuit 100. The internal clock generator 210 is utilized to provide an internal clock signal CLK1 to the IC 104 and the voice recognition circuit 100, where the internal clock signal CLK1 is utilized as a clock signal for the IC 104 and the voice recognition circuit 100 while the electronic device is in the sleep mode. Since the internal clock generator 210 is utilized to provide the internal clock signal CLK1 to the IC 104 and the voice recognition circuit 100, the electronic device does not have to provide operation clock signal to the IC 104 and the voice recognition circuit 100 while the electronic device is in the sleep mode. Therefore, power consumption of the electronic device may be further reduced. However, the disclosure is not limited to clock signal with one frequency. In other exemplary embodiments, the internal clock generator 210 may provide clock signals of different frequencies to the circuits in the microphone apparatus 100 as the operation clock signal when the electronic device is in operation mode.

Figure 3:
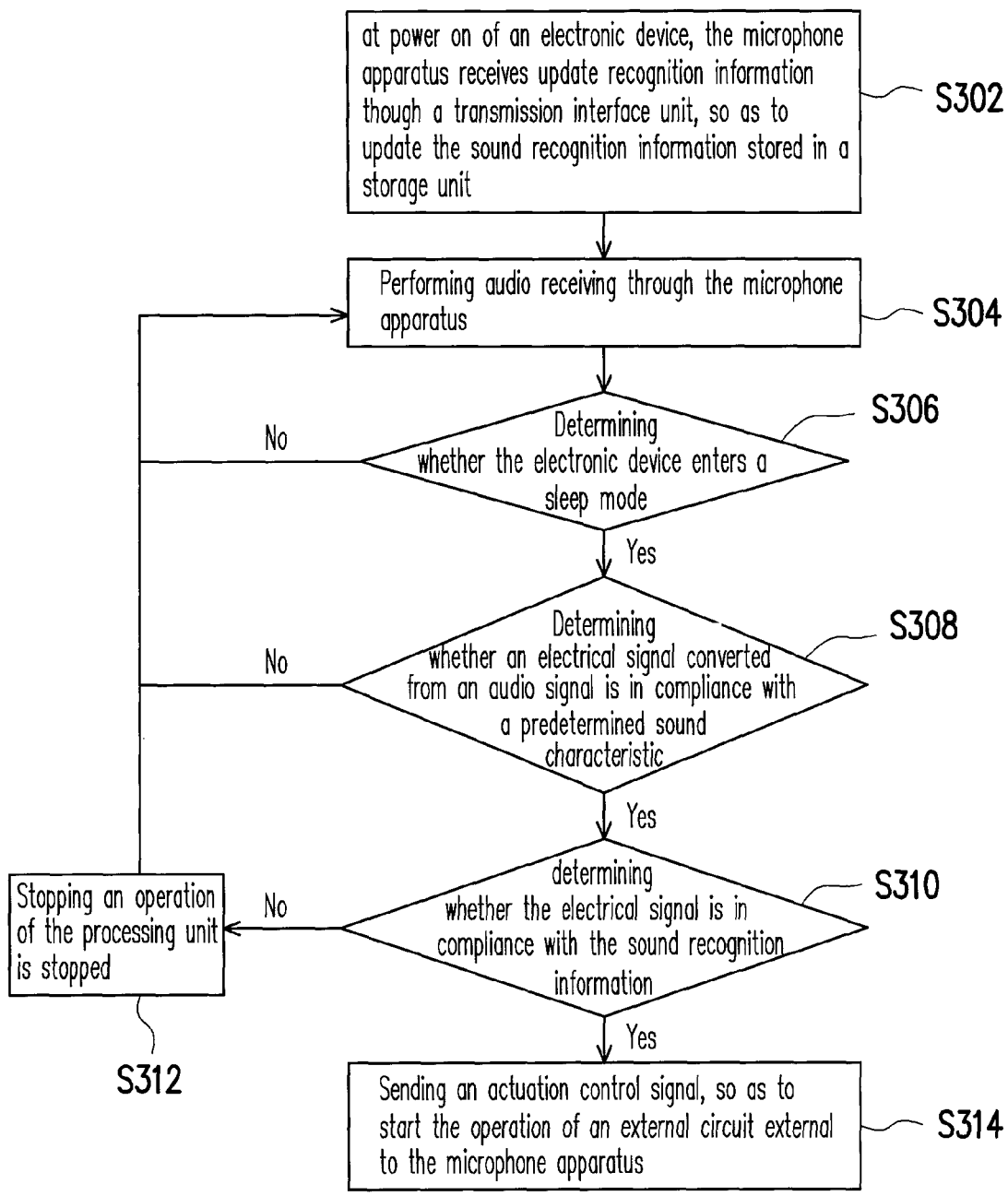
FIG. 3 is a flow diagram illustrating a voice wakeup method according to an exemplary embodiment of the disclosure, please refer to FIG. 3.

FIG. 3 is a flow diagram illustrating a voice wakeup method according to an exemplary embodiment of the disclosure, please refer to FIG. 3. From the above exemplary embodiment, the method for the microphone apparatus to wake up an external circuit may include the following steps. Firstly, at power on of an electronic device, the microphone apparatus receives update recognition information though a transmission interface unit, so as to update the sound recognition information stored in a storage unit (step S302.) Next, audio receiving is performed through the microphone apparatus (step S304.) Then, whether the electronic device enters a sleep mode is determined (step S306.) If the electronic device has not entered the sleep mode, the process would return to the step S304 to continue to perform audio receiving. If the electronic device is the sleep mode, it is determined whether an electrical signal converted from an audio signal is in compliance with a predetermined sound characteristic (step S308.) If the electrical signal is compliance with the predetermined sound characteristic, the processing unit determines whether the electrical signal is in compliance with the sound recognition information (step S310). If the electrical signal is not in compliance with the sound recognition information, the process returns to the step S304 to continue to perform audio receiving. If the electrical signal is not in compliance with the sound recognition information, the operation of the processing unit is stopped (step S312), and the process returns to the step S304 to continue to perform audio receiving. If the electrical signal is in compliance with the predetermined sound recognition information, an actuation control signal is sent, so as to trigger the operation of an external circuit external to the microphone apparatus (step S314).

Based on the above, the processing unit of the exemplary embodiments of the disclosure determines whether the electrical signal converted from the audio signal is in compliance with the predetermined sound characteristic and the sound recognition information while the electronic device is in the sleep mode. The processing unit would only send out the actuation control signal when the electrical signal is in compliance with the predetermined sound characteristic and the sound recognition information, so as to enable the external circuit that is external to the microphone apparatus by the voice recognition circuit. Therefore, a reparative waking up of the external circuit may be avoided, so as to reduce unnecessary power consumption. In some of exemplary embodiments, the processing unit may be activated only when the sound volume of the electrical signal detected by a detection unit exceeds a predetermined threshold. Such further reduces the power consumption. Furthermore, the electronic device under sleep mode does not have to provide an operational clock signal to an IC and the voice recognition circuit, since an internal clock generator in the microphone device provides an internal clock signal. Accordingly, the power consumption may be further reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A microphone apparatus, adapted to an electronic device, the microphone apparatus comprising:
   a Micro-Electro-Mechanical System (MEMS) circuit, converting an audio signal received by the microphone apparatus to an electrical signal;
   an integrated circuit (IC), coupled to the MEMS circuit, amplifying the electrical signal;
   a voice recognition circuit, coupled to the IC, triggering an operation of an external circuit external to the microphone apparatus; and
   an internal clock generator, coupled to the IC and the voice recognition circuit, providing an internal clock signal to the IC and the voice recognition circuit as an operation clock signal for the IC and the voice recognition circuit under a sleep mode,
   wherein the processing unit determines whether the electrical signal is in compliance with a predetermined sound characteristic and whether the electrical signal is in compliance with a sound recognition information while the electronic device is in the sleep mode, wherein the processing unit sends an actuation control signal when the electrical signal is in compliance with the predetermined sound characteristic and the sound recognition information, so that the voice recognition circuit triggers the operation of the external circuit external to the microphone apparatus.

2. The microphone apparatus as claimed in claim 1, wherein the voice recognition circuit comprises:
   a detection unit, coupled to the IC, detecting a sound characteristic of the electrical signal, determining whether the electrical signal is in compliance with the predetermined sound characteristic, activating the processing unit if the electrical signal is in compliance with the predetermined sound characteristic;
   a storage unit, coupled to the processing unit, storing a sound recognition information; and
   a triggering unit, coupled to the processing unit, triggering an operation of the external circuit external to the microphone apparatus after the actuation control signal is received.

3. The microphone apparatus as claimed in claim 2, wherein the detection unit is a voice activity detector (VAD).

4. The microphone apparatus as claimed in claim 2, wherein the voice recognition unit further comprises:
   a transmission interface unit, coupled to the processing unit, wherein the processing unit receives an update recognition information through the transmission interface unit, and storing the update recognition information to the storage unit as the sound recognition information.

5. The microphone apparatus as claimed in claim 4, wherein the transmission interface unit is an inter-integrated circuit transmission interface.

6. The microphone apparatus as claimed in claim 1, wherein the electrical signal is an analog signal, and the IC converts the electrical signal to a digital signal.

7. The microphone apparatus as claimed in claim 1, wherein the predetermined sound characteristic is a predetermined threshold, and the processing unit determines whether the sound characteristic of the electrical signal is in compliance with the predetermined sound characteristic if a sound volume of the audio signal received by the microphone apparatus is greater than the predetermined threshold.

8. The microphone apparatus as claimed in claim 1, wherein the sound recognition information is a keyword, and the processing unit compares the electrical signal to the keyword, and the processing unit determines that the electrical signal is in compliance with the sound recognition information if the electrical signal is in compliance with the keyword.

9. The microphone apparatus as claimed in claim 1, wherein the processing unit first determines whether the electrical signal is in compliance with the predetermined sound characteristic, and then determines whether the electrical signal is in compliance with the sound recognition information.

10. The microphone apparatus as claimed in claim 1, the internal clock generator provides clock signals having different frequencies.

* * * * *